United States Patent [19]

Butler et al.

[11] Patent Number: 5,267,179
[45] Date of Patent: Nov. 30, 1993

[54] FERROELECTRIC OPTICAL IMAGE COMPARATOR

[75] Inventors: Michael A. Butler; Cecil E. Land; Stephen J. Martin, all of Albuquerque; Kent B. Pfeifer, Los Lunas, all of N. Mex.

[73] Assignee: The United States of America as represented by the United States Department of Energy, Washington, D.C.

[21] Appl. No.: 400,851

[22] Filed: Aug. 30, 1989

[51] Int. Cl.⁵ .............................................. G11C 11/22
[52] U.S. Cl. ..................................... 364/514; 382/32; 382/34
[58] Field of Search ............... 364/514, 819, 820, 861; 365/117; 382/34, 42, 32; 359/56, 72, 561

[56] References Cited

U.S. PATENT DOCUMENTS

| | | | |
|---|---|---|---|
| H331 | 9/1987 | Gregory et al. | 359/561 |
| 3,293,441 | 12/1966 | Kazan et al. | 250/213 |
| 3,295,103 | 12/1966 | Driese et al. | 382/34 |
| 3,388,240 | 6/1968 | Robbins | 382/42 |
| 3,668,635 | 6/1972 | Mizobuchi et al. | 382/31 |
| 3,891,968 | 6/1975 | McMahon | 382/31 |
| 3,945,715 | 3/1976 | Drake | 365/112 |
| 3,975,710 | 8/1976 | Watanabe et al. | 340/146.3 |
| 3,980,818 | 9/1976 | Browning | 365/215 |
| 4,053,228 | 10/1977 | Schiller | 382/31 |
| 4,080,532 | 3/1977 | Hopper | 250/332 |
| 4,100,573 | 7/1978 | Berger | 358/113 |
| 4,139,908 | 2/1979 | Brody | 365/117 |
| 4,158,201 | 6/1979 | Smith et al. | 340/783 |
| 4,187,000 | 2/1980 | Constant | 364/820 |
| 4,391,901 | 7/1983 | Land et al. | 430/495 |
| 4,449,193 | 5/1984 | Tournois | 364/820 |
| 4,475,238 | 10/1984 | Everhart | 382/34 |
| 4,504,923 | 3/1985 | Schlunt et al. | 364/728 |
| 4,601,537 | 7/1986 | Sacaccio | 359/56 |
| 4,606,067 | 8/1986 | Ernst | 382/42 |
| 4,690,554 | 9/1987 | Froelich | 356/71 |
| 4,745,633 | 5/1988 | Waksman et al. | 382/56 |
| 4,892,370 | 1/1990 | Lee | 359/561 |
| 4,996,667 | 2/1991 | Murano et al. | 365/117 |
| 5,016,992 | 5/1991 | Woike et al. | 365/117 |
| 5,029,220 | 7/1991 | Juday | 382/32 |
| 5,073,010 | 12/1991 | Johnson et al. | 359/72 |
| 5,109,290 | 4/1992 | Imai | 359/721 |
| 5,111,413 | 5/1992 | Lazansky et al. | 314/488 |

OTHER PUBLICATIONS

Land et al.; "New Image Storage Mechanisms in PLZT Ceramics Using Near-UltraViolet Light"; IEE-SID Biennial Display Conf. 10/12-14/76.
Land; "Photoferroelectric Image Storage"; IEEE Tran. on Electron Devices; Aug. 1979.
C. Land et al., "Photoferroelectric Effects In PLZT Ceramics", Ferroelectrics, 1978, vol. 22, pp. 677-679.
F. Micheron et al., "A Ferroelectric Image Memory", Ferroelectrics, vol. 10, 1976, pp. 15-18.
S. Martin et al., "Ferroelectric Optical Image Comparator Using PLZT Thin Films", Electronics Letters, vol. 24, No. 24, Nov. 24, 1988, pp. 1486-1487.

Primary Examiner—Parshotam S. Lall
Assistant Examiner—Ellis B. Ramirez
Attorney, Agent, or Firm—Karuna Ojanen; James H. Chafin; William R. Moser

[57] ABSTRACT

A ferroelectric optical image comparator has a lead lanthanum zirconate titanate thin-film device which is constructed with a semi-transparent or transparent conductive first electrode on one side of the thin film, a conductive metal second electrode on the other side of the thin film, and the second electrode is in contact with a nonconducting substrate. A photoinduced current in the device represents the dot product between a stored image and an image projected onto the first electrode. One-dimensional autocorrelations are performed by measuring this current while displacing the projected image.

21 Claims, 5 Drawing Sheets

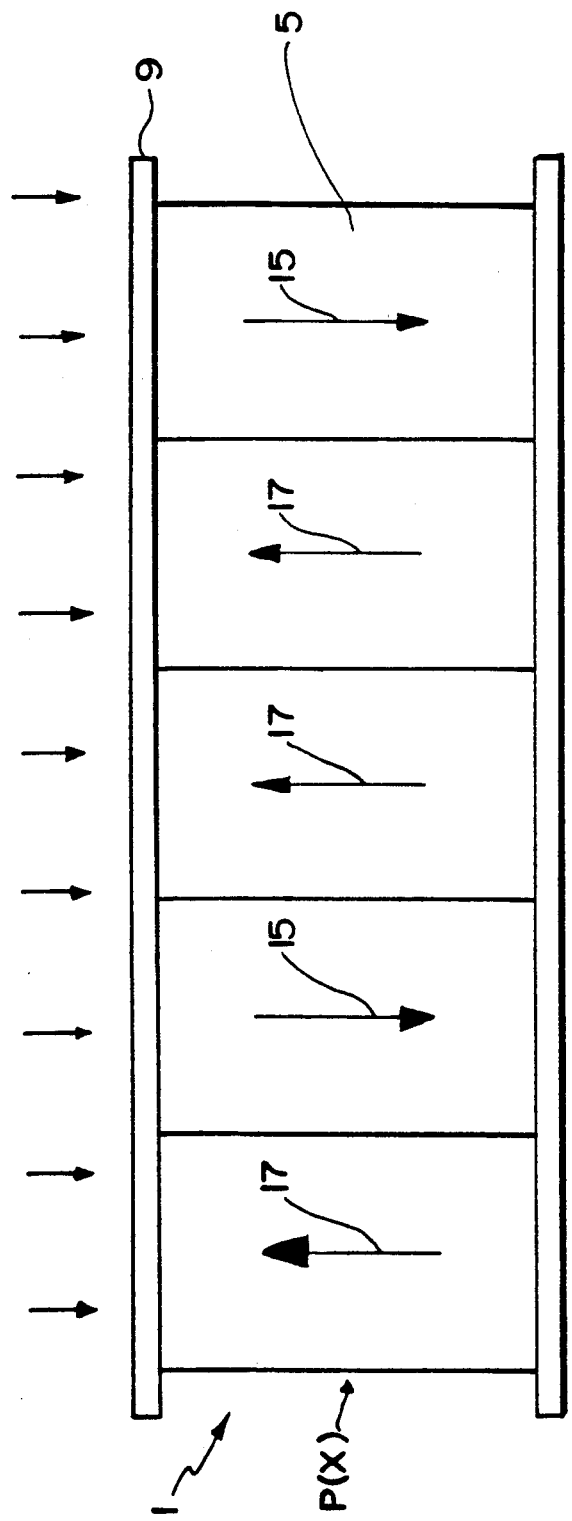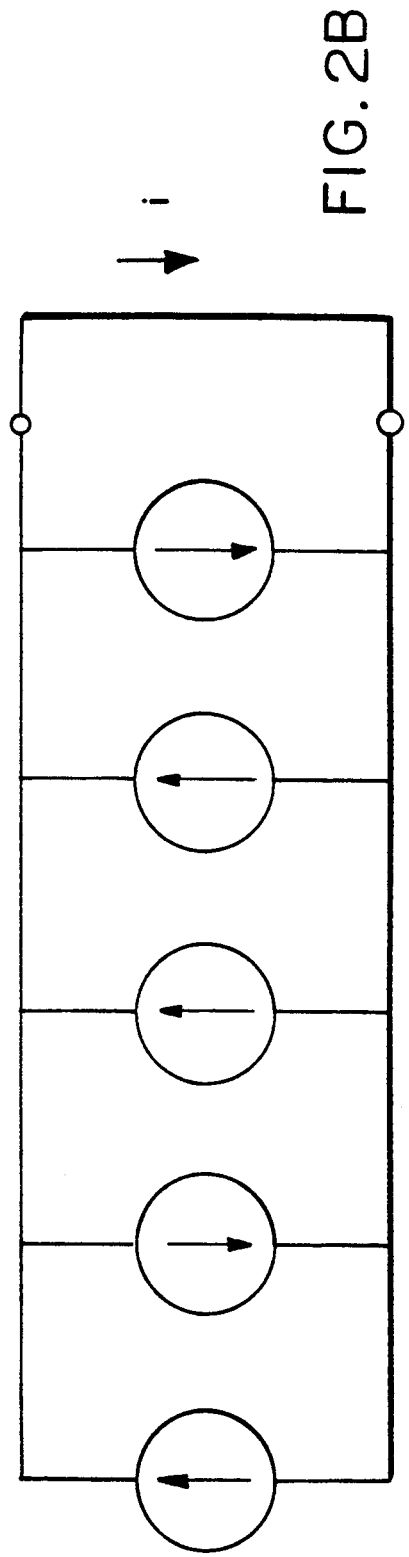
FIG. 2A
FIG. 2B

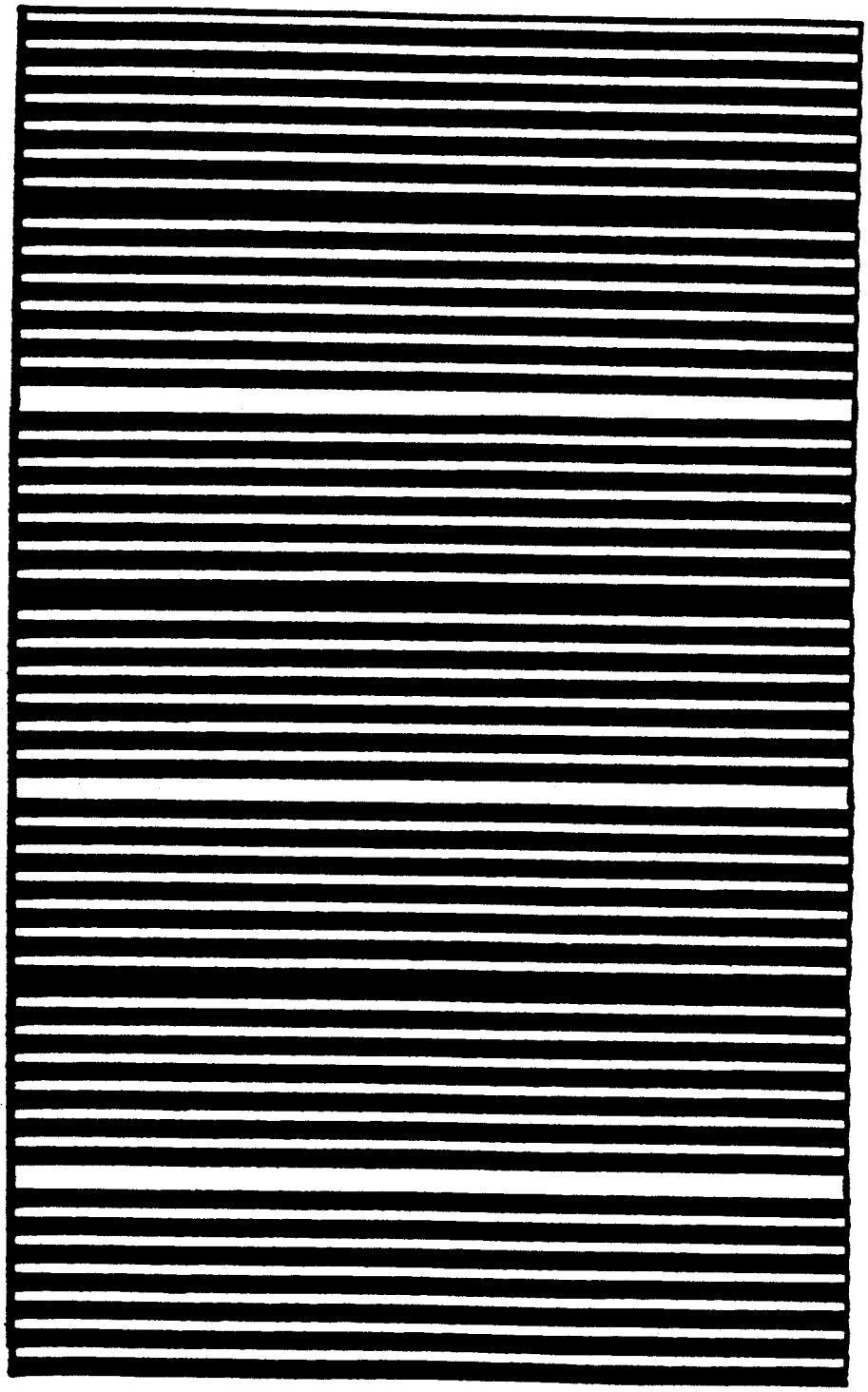
FIG. 3 Alternating 7-Bit 7-Cycle Bar Code, 120 um/bar, total pattern 11760 um

FERROELECTRIC OPTICAL IMAGE COMPARATOR

The Government has rights in this invention pursuant to Contract No. DE-AC04-76DP00789 awarded by the U.S. Department of Energy to AT&T Technologies, Inc.

BACKGROUND OF THE INVENTION

This invention relates generally to a method and apparatus for image correlation and, more particularly, to a ferroelectric optical image correlation (FOIC) device.

The property of ferroelectric ceramics such as lead lanthanum zirconate titanate (PLZT) to store information has been known for many years. This relates to the property of ferroelectric ceramic materials to become remanently polarized when an electric signal is applied to the material. The combination of a positive bias voltage and light exposure causes the ferroelectric domains to reorient or reverse in the exposed regions while remaining unchanged in the unexposed regions. In studies of the maximum resolution of images stored in PLZT bulk ceramic plates, it was found that the minimum size of a pixel (image resolution element) is approximately four to five grain diameters. The minimum grain size that has been obtained in PLZT bulk ceramics is about 1 $\mu$m and the minimum pixel size is about 4 to 5 $\mu$m. This process of image storage using PLZT polycrystalline plates has been found for these reasons to be unsuitable for use in an FOIC because of the poor resolution.

Additionally, when light is transmitted through a PLZT polycrystalline ceramic plate, it encounters refractive index mismatches at grain and domain boundaries which produce depolarization and light scattering. For FOIC applications, light scattering in the storage medium greatly reduces the resolution of stored images and destroys the image correlation capabilities of the FOIC. In this regard, the switching time determines the lower boundary with respect to the image storage time. Switching times on the order of tens of microseconds are typical for PLZT ceramic plates. In many applications of FOIC devices, such switching times are inadequate.

Because of the very large information content in an optical image, it is generally difficult to process such an image on a real-time basis using even the fastest digital computing techniques. Consequently, there is a need for various analog devices which, because of their parallel nature, can process optical images on a real-time basis.

Correlation devices have a wide variety of present applications and an even wider variety of future uses. These devices provide a way for determining whether an externally perceived object matches or looks the same as a known object. A few examples of systems which either use or could use correlation devices include intrusion detection systems which signal when the scene changes, terrain identification systems which signal when an image is matched with a map, counterfeit detection systems which signal when a document examined does not match the pattern of an authentic document, and critical alignment systems which signal when a target image such as a component of a machine is properly positioned.

In all of the above examples of correlation devices, one of the most important requirements is that the device be able to perform the necessary correlations at great speed without the need for many optical components and the use of slow mechanical scanning components. These latter components are simply too bulky and are unsuitable in many applications where the target image is in motion.

SUMMARY OF THE INVENTION

Accordingly, it is a general object of the invention to provide a method and apparatus for storing a two-dimensional image and then comparing it with an unknown image to determine the degree of similarity of the two.

Another object of the invention is to provide a device in which a stored image can be held in a nonvolatile manner, e.g., for future comparison, and, e.g., as in a memory which can be erased and rewritten.

Yet another object of the invention is to provide a correlation device which uses a ferroelectric material to nearly instantaneously, on a real-time basis, compare a stored image with a perceived image.

Still another object is to provide an FOIC device having a PLZT polycrystalline material which overcomes the problems of light scattering, resolution, and switching speed of the conventional PLZT bulk ceramic plates.

These and other objects of the instant invention are achieved by providing an FOIC device with high resolution and switching speeds and little or no light scattering. The device comprises a PLZT polycrystalline thin film having a first surface and a second surface. The first surface is coated with a semi-transparent conductive material to form a first electrode. The second surface is coated with a conductive material to form a second electrode. The device also includes a means for supplying a first voltage across said electrodes to polarize all of the ferroelectric domains in said ferroelectric material toward the second electrode. An image is stored when a means for supplying a second smaller voltage of opposite polarity is applied across the electrodes while a first image is projected onto the first electrode, thereby switching the ferroelectric remanent polarization of the ferroelectric material in the areas illuminated. When used as an FOIC, a means is provided to project a second image in the blue or near ultraviolet region of the spectrum onto the first electrode to generate charge carriers in the areas which are illuminated on the first electrode. In addition, a means is provided to measure the short circuit photocurrent across the first and second electrodes which is the two-dimensional dot product of the stored and projected images and an indication of the degree of similarity between these images. The PLZT thin-film device comprises a thin film of PLZT having a thin, conductive semi-transparent aluminum coating on one of its surfaces and a conductive coating or attached layer of platinum on its other surface.

DESCRIPTION OF THE DRAWING

Other objects and many of the attendant advantages of the invention will become readily appreciated as the same becomes better understood by reference to the following detailed description when considered in connection with the accompanying drawings wherein:

FIGS. 2A and 2B together form a schematic diagram of the ferroelectric thin film shown in FIG. 1 when it is illuminated;

FIG. 3 is a bar pattern image stored in the PLZT thin-film device of the present invention;

In FIG. 4A the photocurrent was measured across the electrodes on the ferroelectric while displacing the pattern over a distance in the x direction.

DETAILED DESCRIPTION OF THE PREFERRED EMBODIMENT

Figure 1:
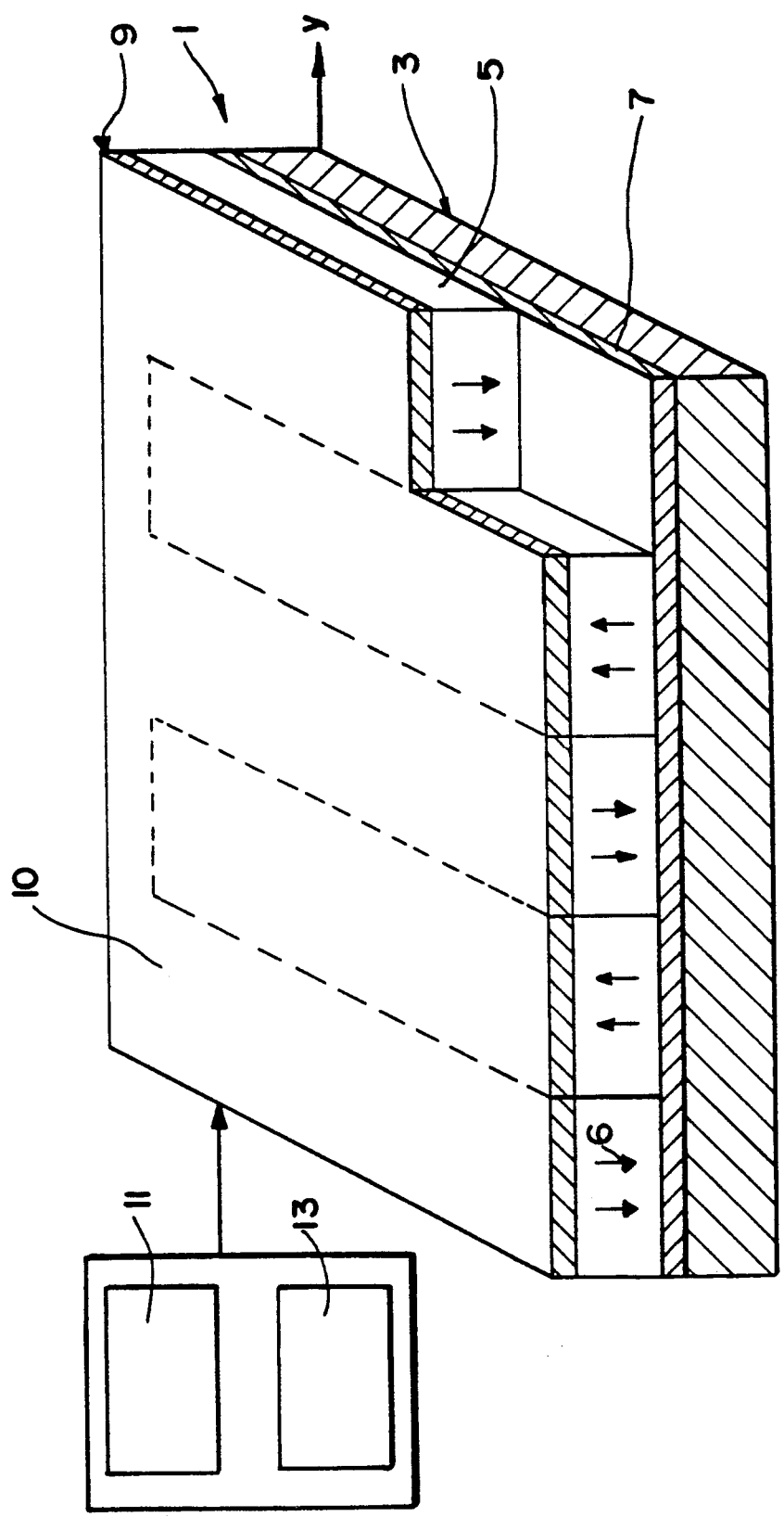
FIG. 1 is a perspective view partially cut away showing the ferroelectric thin film and the various layers of other materials which make up the image correlation device.

Referring now to the various figures of the drawings wherein like reference characters refer to like parts, there is shown at 1 in FIG. 1 a ferroelectric thin film used in a ferroelectric image correlation device constructed in accordance with the present invention.

It should be pointed out that the plate 1 as shown and otherwise disclosed in the foregoing application is merely exemplary of an operative image correlation device which can be constructed utilizing the phenomena of photo-assisted domain switching in photo-ferroelectric materials. It is understood that a commercial embodiment of device 1 may necessarily include additional conventional components whose use and inclusion within the device is well within the skill of the art.

The FOIC 1 is arranged to indicate whether an externally sensed image matches a particular image stored in the memory of the ferroelectric material. For the purposes of the foregoing discussion, the word "match" shall be used not only to refer to instances where there is an exact match between the two images, but also to cases where there is a substantial match as defined by selected criteria or cases where the two images are identical but are misaligned on the surface of plate 1. The device 1, through the utilization of the principle of ferroelectric domain switching, measures the similarity or dissimilarity of an image with an image previously stored in the device.

In a preferred embodiment as shown in FIG. 1, the FOIC 1 comprises a substrate 3, preferably constructed of a non-conductive material such as silicon. In most applications substrate 3 is used only for the mechanical support of the other components of the FOIC. A thin-film ferroelectric material 5 has a conductive electrode 7 on one of its surfaces. On the other exposed surface of the ferroelectric material 5 is a semi-transparent or transparent conductive layer 9. The other surface of electrode 7 is attached to substrate 3 so as to form a unitary structure which can easily be handled and installed in equipment.

The substrate 3 may be transparent or opaque. If the substrate material is electrically conductive, it may serve as the base or lower electrode of the FOIC. If the substrate is nonconductive, a conductive film electrode 7 is contacted with the surface of the substrate by any convenient deposition technique (e.g., vacuum evaporation, sputtering, etc.), or other equivalent means. If the FOIC is to be transparent, both the substrate 3 and the base electrode 7 must be transparent. If the FOIC is reflective, the base electrode 7 must also be reflective.

In a preferred embodiment, a PLZT thin film 5 is deposited on the surface of the base electrode 7 by any technique capable of producing a chemically and physically homogeneous, polycrystalline thin film with perovskite crystal structure, e.g., planar rf magnetron sputtering, sol-gel solution spinning, sputtering from multiple Pb, La, Zr and Ti metal targets, etc. Preferably, the PLZT film thickness is about 1 $\mu$m, but it may be as thin as 0.2 $\mu$m or as thick as 10 $\mu$m. Generally, the optical resolution of images stored in the PLZT thin film 5 is approximately equal to the film thickness. A composition of the PLZT solid solution can be given by the formula $Pb_{1-x}La_x(Zr_yTi_z)_{1-x/4}O_3$, where $y+z=1$. The common designation is PLZT X/Y/Z, where $X=100x$, $Y=100y$ and $Z=100z$. The preferred PLZT thin film 5 has a composition according to the above formula with the constituents within the following ranges: $0 \leq x \leq 0.25$, $0 \leq y \leq 0.96$ and $0.4 \leq z \leq 1.0$ or $0 \leq X \leq 25$, $0 \leq Y \leq 96$ and $4 \leq Z \leq 100$. Films within this composition range which exhibit a ferroelectric phase at room temperature (about 25° C.) are desirably used in FOIC devices. Preferably, ferroelectric-phase PLZT thin films are used which switch from positive to negative saturation remanent polarization (i.e., from one image state to another) in less than 1 nsec ($10^{-9}$ sec).

The top electrode 9 of the FOIC is preferably a transparent or semi-transparent, conductive thin film. The film 9 may be a highly-conductive metal, e.g., gold or aluminum, or a transparent metal oxide, e.g., indium-tin oxide (ITO), may be used. The film 9 may be contacted with the surface of the PLZT thin film 5 by conventional techniques, e.g., vacuum evaporation, sputtering, or by any technique which will produce a thin film having a thickness of from about 10 nm to 300 nm which is homogeneous, transparent or semi-transparent (e.g., to radiation of a wavelength to which the underlying ferroelectric film is sensitive), and conductive. Although the above materials have been found to be useful for the top electrode, other conventional materials may also be used.

For example, an FOIC device was constructed which demonstrated pattern recognition capabilities. This device consisted of an optically polished, silicon substrate with a 0.5 $\mu$m thick platinum base electrode sputtered on the optically polished surface. A 1 $\mu$m-thick PLZT 0/50/50 ferroelectric film was used as the image storage and correlation medium, and a 20 nm-thick semi-transparent aluminum top electrode was deposited on the PLZT film.

Ferroelectric-phase PLZT thin films are photosensitive in the near-UV and in the blue end of the visible spectrum. For example, a PLZT 0/50/50 film is about three orders of magnitude more photosensitive than a bulk ceramic plate of the same composition. At a wavelength of 365 nm, the PLZT 0/50/50 film has a photosensitivity of $1.6 \times 10^{-3}$ cm$^2$/erg, which corresponds to an ISO film sensitivity of about $1.6 \times 10^{-3}$. The exposure required to store an image in this film is about 63 $\mu$J/cm$^2$ using 365 nm wavelength light. The photosensitivity to blue light at 436 nm is about $3.2 \times 10^{-4}$ cm$^2$/erg or a factor of about 5 times less than the sensitivity at 365 nm. In thin PLZT ceramic wafers, the photosensitivity is improved by as much as four orders of magnitude by implanting in the ceramic He, Ne and Ar ions. Similar improvements in photosensitivity may be obtained by ion implantation in PLZT thin films. Preferably, the photosensitivity at longer wavelengths in the visible spectrum are substantially improved by implantation of chemically active ions such as Al and Cr. Similar results are possible in the thin films of the present invention. The effects of ion implantation on the photosensitivity of PLZT ceramics are described in U.S. Pat. No. 4,391,901.

The FOIC 1 is connected to a voltage source 11 and an indicator means 13. The voltage source 11 is connected between the first and second electrodes 9 and 7, respectively, so as to apply a voltage to both surfaces of ferroelectric material 5. The voltage source 11 is adapted to vary the voltage and the polarity of the charge to the electrodes 7 and 9. Indicator means 13 measures the current between the electrodes 7 and 9.

In FIG. 2A, the direction of the ferroelectric remanent polarization is illustrated by the arrows 15. The direction of the ferroelectric remanent polarization corresponding to a stored image is shown as arrow 17 in ferroelectric material 5. When the surface of electrode 9 is illuminated, the direction of the short circuit current flowing between electrodes 7 and 9 at the various areas extending across plate 5 is illustrated in FIG. 2B. There it can be seen that the current flows in the same direction as the ferroelectric remanent polarization in thin film 5. The FOIC in FIG. 1 can be used to store a first image projected onto surface 10 of electrode 9. The device 1 is prepared for image storage by applying to the electrode 9 a negative bias with respect to electrode 7. This results in uniform orientation of the ferroelectric domains throughout the entire ferroelectric film 5.

In FIG. 1, the orientation of the ferroelectric domains is illustrated by arrows 6 in film 5. Thereafter, a smaller positive bias with respect to electrode 7 is applied to electrode 9 while projecting an image of the pattern to be stored. In the simplest case, the projected image is digital with varying spatial intensities having values I or zero. The combination of the positive bias and light exposure to surface 10 of layer 9 causes the ferroelectric domain orientation to reverse in the exposed regions while remaining unchanged in the unexposed regions. If ideal storage conditions are chosen, the procedure results in a film orientation which varies as:

$$P(x,y) = \begin{cases} +P \text{ if } (x,y) \text{ is light} \\ -P \text{ if } (x,y) \text{ is dark} \end{cases} \quad (1)$$

in which P is the polarization magnitude. This polarization pattern is a non-volatile digital representation of the pattern P(x,y).

In a preferred embodiment, the device is first poled by applying a −8 volt bias to the top electrode 9 (with respect to lower electrode 7). A +1 volt bias is then applied for 2 minutes while projecting an image of the pattern to be stored. The combination of bias reversal and light exposure causes the ferroelectric domains to reorient more in the exposed regions than in the unexposed regions, thus storing the image.

The PLZT film 5 offers a number of advantages over conventional magnetic devices used in storing images. First, the pattern can be stored in the ferroelectric material in a non-volatile fashion for purposes of later comparison. This feature results from storage of the image as a spatially varying ferroelectric domain orientation illustrated in FIGS. 1 and 2A. Because of the way the image is stored, the pattern can be erased from the device and a new pattern inserted at any time. Erasure of the stored pattern can be accomplished simply by applying a strong negative bias across electrodes 7 and 9 to reorient the ferroelectric domains toward electrode 7. A new pattern can then be stored in the ferroelectric film 5 in the same manner as described above.

The FOIC 1 offers another advantage in its high resolution capabilities. In general, the resolution is approximately the thickness of film 5. Thus, for a 1-micrometer-thick film, images can be stored with resolutions approaching 1 pixel per square micron.

In the polycrystalline thin films of the present invention, crystallite (grain) dimensions are small (20 nm to 100 nm) compared to the wavelength of near-UV or visible light. Ferroelectric domains are as small as or smaller than grains, so that refractive index mismatches at grain and domain boundaries do not scatter transmitted light.

Since switching times of subnanoseconds are easily achieved with the PLZT thin films, these thin films have an important advantage in storage speed over the PLZT bulk ceramic.

The second electrode can be attached to substrate 3 to provide a convenient support for the ferroelectric material. In a preferred embodiment, substrate 3 is formed of a non-conductive silicon chip.

In comparing the stored image with a second image, the second image produced by light in the near ultraviolet or blue region of the spectrum is projected onto surface 10 of electrode 9. The second image generates mobile charge carriers which are moved by the internal field resulting from the polarization, and these charges are collected at the first and second electrodes 7 and 9, respectively. The indicator means 13 measures the short circuit photocurrent between electrodes 7 and 9. Each illuminated region of the surface 10 generates a current which contributes to the total photocurrent generated. The local photocurrent contribution is proportional to the product of polarization and the illumination intensity. The regions polarized +P generate photocurrents of opposite polarity to those regions polarized −P, as illustrated in FIG. 2B. The electrodes 7 and 9 serve to integrate the currents resulting from the illumination of a second image. The total current represents the two-dimensional dot product of the stored and projected images over surface 10 of electrode 9. Measurement of this current by indicator means 13 is very rapid and provides an assessment of the similarity between the first and second images.

A two-dimensional correlation can be performed between the stored image and the second illuminating pattern by moving one with respect to the other and measuring the current generated as a function of the displacement. For many pattern recognition applications, it is preferred to store the Fourier transform image rather than the direct image of an object. Conventional Fourier transform optics can be used to generate the Fourier transform image for comparison with the stored Fourier transform image. The device 1 of the present invention is particularly suitable for use in pattern recognition. When a two-dimensional image is projected onto the device of FIG. 1 containing a stored image, the photocurrent generated between electrodes 7 and 9 is the two-dimensional dot product of the images. This dot product is an indication of the similarity between the projected and stored images. The dot product is largest when the stored and projected images are identical and perfectly aligned and smaller when the images are dissimilar or misaligned.

A ferroelectric device was constructed according to the present invention using a 1-micrometer-thick film of ferroelectric lead zirconate titanate. On one surface of this film was sputter-deposited a semi-transparent aluminum electrode 20 nm thick. On the other surface of the PLZT film was deposited a platinum electrode 0.5 micrometers thick.

Figure 4A:
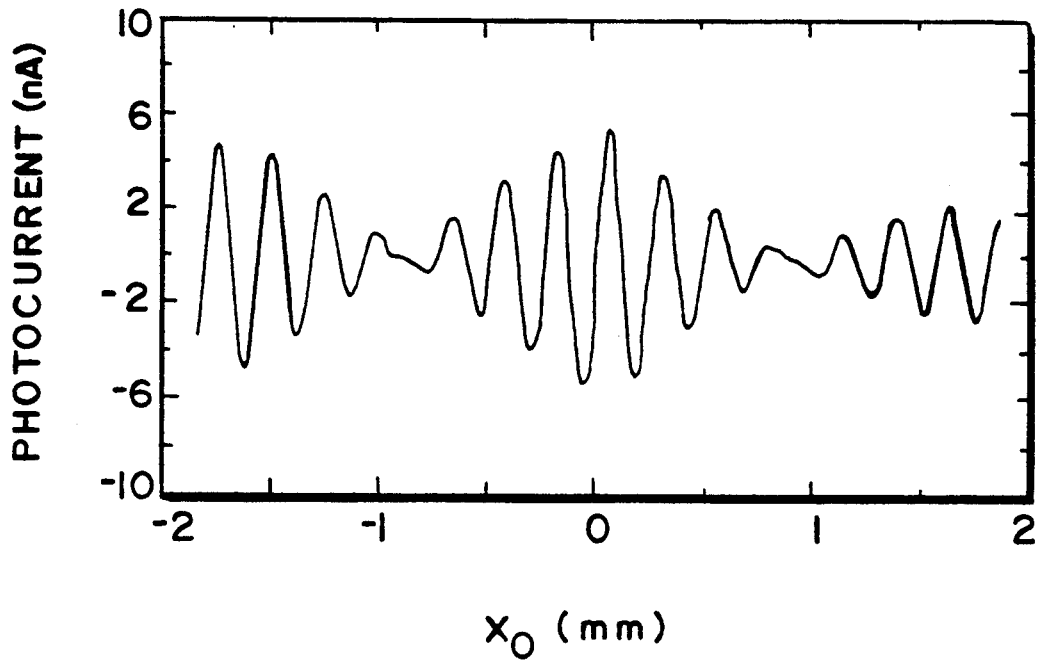
FIGS. 4A and 4B are charts showing the short circuit photocurrent in experimental and calculated autocorrelation, respectively.
Figure 4B:
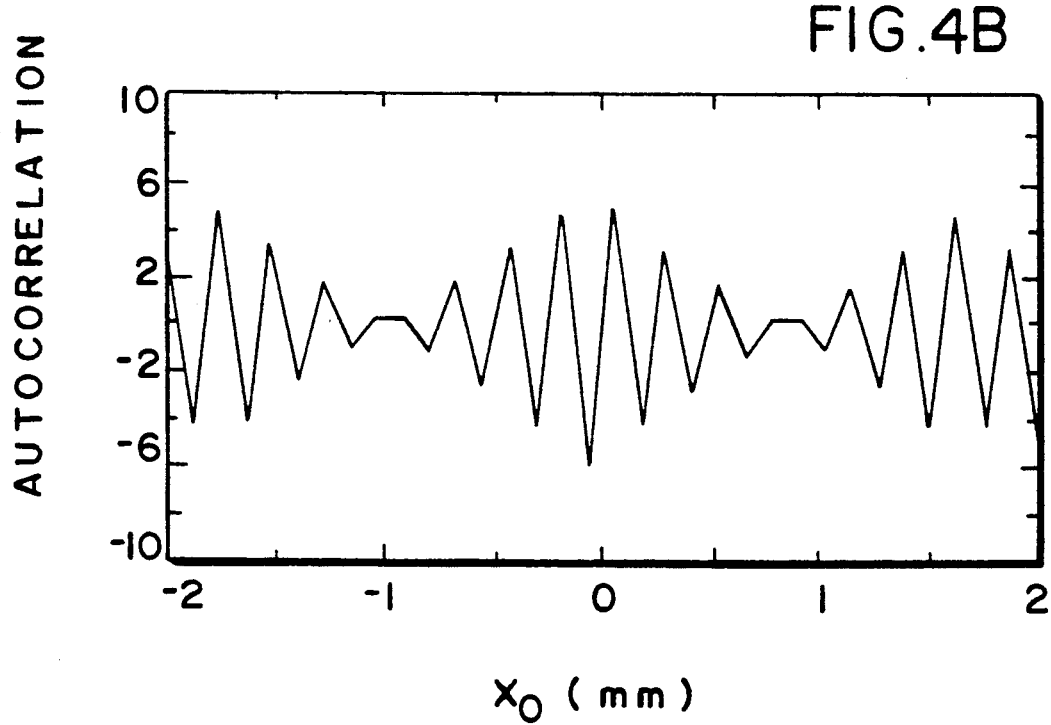

A digital pattern was stored in the ferroelectric film using the procedure described above. The pattern recognition capability was then demonstrated by projecting the same image onto the semi-transparent aluminum electrode, and the current was measured between the aluminum and platinum electrodes as the projected image was displaced with respect to the stored image. The pattern used for this autocorrelation was a periodic bar pattern shown in FIG. 3. A xenon light source and lens system were used to project this pattern from a glass plate onto the device. Each bar in the projected image was 120 micrometers wide. The short-circuit photocurrent from the ferroelectric device was measured while displacing the pattern over a limited distance in the x direction as shown in FIG. 4A. The autocorrelation of this doubly periodic image results in a "beat pattern", with periodic variations modulated by a triangular envelope. Only a portion of the total autocorrelation function is shown in FIG. 4. The autocorrelation is maximum when the stored and projected patterns coincide exactly. FIG. 4B shows the calculated autocorrelation function of the pattern shown in FIG. 3 for distances along the x axis between $-2$ and $+2$ millimeters. The calculated autocorrelation is very similar to that obtained using the PLZT device of the present invention.

A two-dimensional correlation will simply use a conventional means for displacement of the projected image in both the x and y directions.

Figure 5:
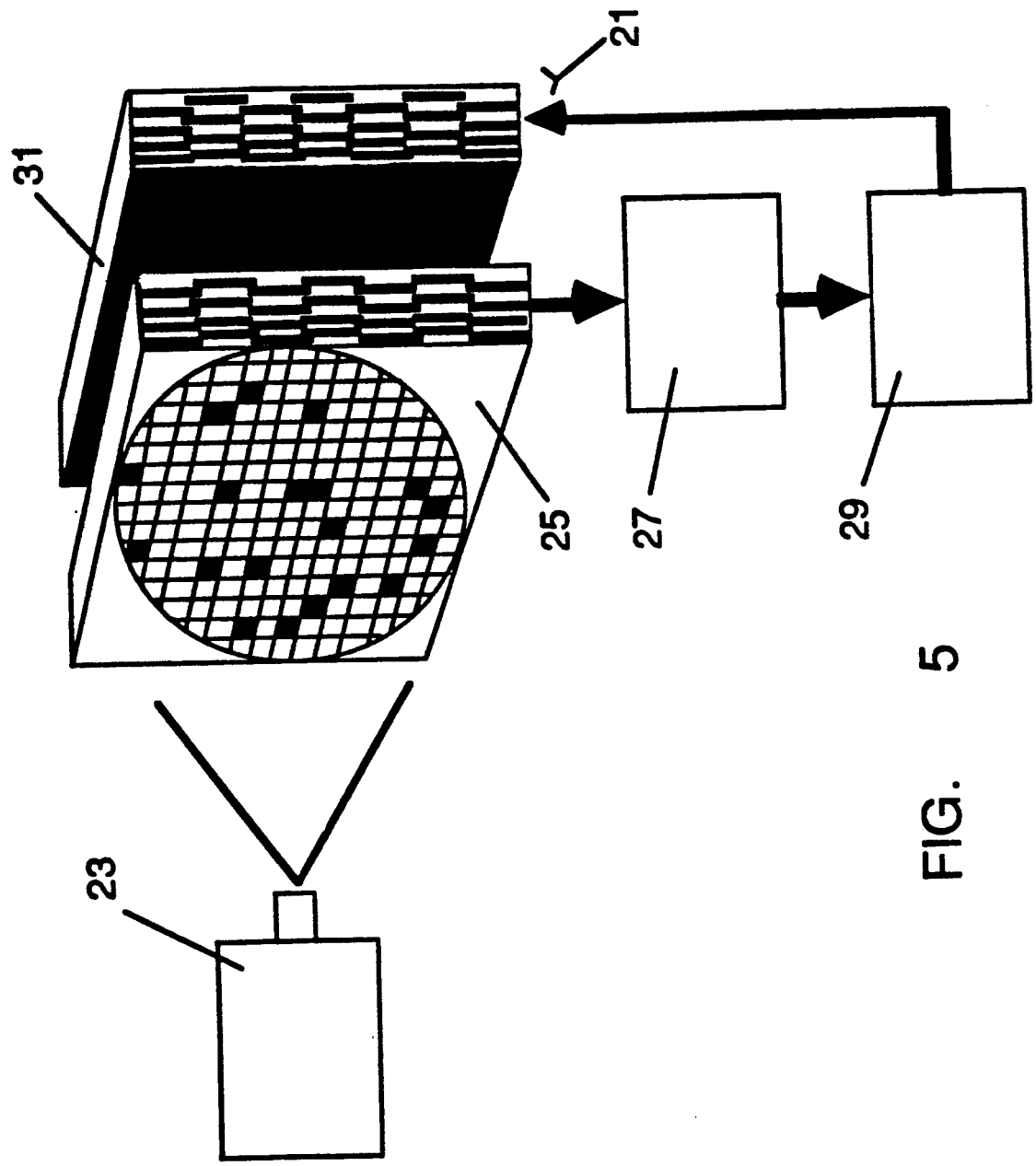
FIG. 5 is a schematic view of an image comparator and alignment system of the present invention.

FIG. 5 shows a preferred pattern recognition system 21 which moves the stored image with respect to a projected image to align the images if they are identical. The similarity between the patterns can then be determined by comparing the signal obtained with the maximum computed correlation. FIG. 5 shows a system which utilizes the FOIC of the present invention to perform the dot product between stored and projected images while including the capability for displacing one with respect to the other.

The system in FIG. 5 may be used for the critical alignment of a target image, such as docking a spaceship or the alignment of machine tools for machining or component assembly. An image projector 23 is mounted on a fixed part of the two assemblies to be aligned. It projects a predetermined two-dimensional pattern onto a ferroelectric optical image comparator 25. These two-dimensional patterns are suitable for alignment purposes because their autocorrelation is very low when patterns are misaligned and very high when aligned. For example, images formed from perfect binary arrays which have the property of giving a zero value for the autocorrelation function everywhere except for perfect alignment of the projected and stored patterns when the autocorrelation function has a large value.

Preferably, such patterns are projected onto the FOIC 21 which is mounted on the movable part of the assembly to be aligned. The output from the FOIC is read by ammeter 27, which transmits this value to microprocessor 29. Microprocessor 29, through translation drive means 31, moves the assembly to be aligned through a predetermined search pattern suitable for the two-dimensional code being used. The microprocessor is programmed to ascertain when alignment is achieved by the size of the signal from ammeter 27. Although any of the conventional alignment devices can be used, this basic configuration is preferred for many target image alignment applications.

In other applications a single point dot product is preferred rather than the two-dimensional autocorrelation function. Such systems are considerably simpler in design and operation. For example, in counterfeit document detection, the document being tested is projected on the FOIC with its appropriate stored pattern of an authentic document. The output measured by the ammeter 27 is a measure of the match between the stored image and the projected image. While this technique is simpler in that no translation is required (see FIG. 2), in some applications it is not as reliable as measuring the full two-dimensional autocorrelation function.

As should be appreciated from the foregoing, the device 21, although exemplary of an image correlation device using photoassisted domain switching in a ferroelectric device, nonetheless clearly demonstrates the capabilities and general construction details of such a device. The device 21 results in the calculation of the dot product in an analog fashion with very high resolution capabilities and nearly instantaneous output, and can readily be adapted for use in comparing images of differing dimensions.

The entire texts of all applications, patents and publications, if any, cited above and below, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An image comparator device comprising a thin-film ferroelectric material having a first surface and a second surface, said first surface being coated with a semi-transparent conductive material to form a first electrode, said second surface being coated with a conductive material to form a second electrode, means for supplying a first voltage across said electrodes to polarize all of the ferroelectric domains in said ferroelectric material toward the second electrode, means for supplying a second smaller voltage of opposite polarity across the electrodes while a first image is projected onto the first electrode, thereby switching the ferroelectric remanent polarization of said ferroelectric material in areas corresponding to said first image which results in the storage of said first image in the ferroelectric material, means to project a second image in the near ultraviolet or visible region of the spectrum onto the first electrode thereby to generate charge carriers on the first electrode in the areas which were illuminated, and means to measure a short-circuit photocurrent across the first and second electrodes, thereby to determine the two-dimensional dot product of the stored and projected images and the degree of correspondence between the first and second images.

2. The device of claim 1, wherein the ferroelectric material is lead lanthanum zirconate titanate.

3. The device of claim 2, wherein a ferroelectric solid solution is used having the formula:

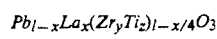

where $y+z=1$.

4. The device of claim 1, wherein the ferroelectric material is from about 0.2 μm to 10 μm in thickness.

5. The device of claim 1, wherein the first electrode is aluminum.

6. The device of claim 5, wherein the aluminum is sputtered onto the ferroelectric thin film.

7. The device of claim 5, wherein the aluminum is deposited onto the ferroelectric thin film by vapor deposition.

8. The device of claim 1, wherein the first electrode is gold.

9. The device of claim 1, wherein the first electrode is indium-tin oxide.

10. The device of claim 1, wherein the second electrode is platinum.

11. The device of claim 10, wherein the second electrode is 0.5 μm thick.

12. The device of claim 1, wherein the ferroelectric material is about 1 μm thick.

13. The device of claim 1, further comprising a nonconductive substrate attached to the outer surface of the second electrode.

14. The device of claim 13, wherein said substrate is silicon

15. A ferroelectric thin-film device for image comparison, comprising:
(a) a thin-film polycrystalline ferroelectric material having a first and second surface, a substantial portion of said first surface being in contact with a semi-transparent or transparent first electrode material and a substantial portion of said second surface being in contact with a second electrode;
(b) means to apply a first voltage bias to said first electrode with respect to said second electrode;
(c) means to apply a second voltage bias to said first electrode;
(d) means to simultaneous project a first image on said thin-film polycrystalline ferroelectric material while said second voltage bias is applied thereby to store said first image;
(e) means to project a second image onto said polycrystalline ferroelectric material thereby generating a short circuit photocurrent between said first and second electrodes;
(f) means to measure said short circuit photocurrent representative of a product of polarization and illumination intensity which is further represented by a dot product to thereby compare said first and second images.

16. The device of claim 15, wherein the first electrode is aluminum.

17. The device of claim 15, wherein the first electrode is indium tin oxide.

18. The device of claim 15, wherein the ferroelectric material is lead lanthanum zirconate titanate.

19. The device of claim 8, wherein the ferroelectric material is lead lanthanum zirconate titanate.

20. A ferroelectric thin-film device, as in claim 15, wherein said thin-film polycrystalline ferroelectric material is a film of ferroelectric lead lanthanum zirconate titanate about 0.2 to 10 μm thick having a first and second surface, said first surface being in contact with a layer of aluminum semi-transparent to near UV or blue radiation as said first electrode material, and said second surface being in contact with a platinum electrode as said second electrode for use in an image comparator.

21. A ferroelectric thin-film device for comprising a thin-film polycrystalline ferroelectric material having a first and second surface, a substantial portion of said first surface being in contact with a semi-transparent or transparent first electrode material and a substantial portion of said second surface being contact with a second electrode, in combination with an ammeter connected to measure the short-circuit current between the first and second electrodes, a translation drive means connected to the thin-film device to move it relative to an image projected onto its surface, and a microprocessor connected to the ammeter and translation device to direct the movement of the thin-film device in a predetermined pattern to form an image correlation device.

* * * * *